(12) United States Patent
Glovak et al.

(10) Patent No.: US 6,709,137 B1
(45) Date of Patent: Mar. 23, 2004

(54) ASSEMBLY INCLUDING ILLUMINATED STEP PAD

(75) Inventors: Dan Glovak, Farmington Hills, MI (US); Joseph A. Griffin, White Lake, MI (US)

(73) Assignee: Decoma International Corporation, Concord (CA)

( * ) Notice: Subject to any disclaimer, the term of this patent is extended or adjusted under 35 U.S.C. 154(b) by 0 days.

(21) Appl. No.: 10/030,023

(22) PCT Filed: Jun. 29, 2000

(86) PCT No.: PCT/CA00/00792

§ 371 (c)(1),
(2), (4) Date: Jun. 17, 2002

(87) PCT Pub. No.: WO01/02214

PCT Pub. Date: Jan. 11, 2001

Related U.S. Application Data

(60) Provisional application No. 60/142,316, filed on Jul. 2, 1999.

(51) Int. Cl.[7] .................................................. B60Q 1/32
(52) U.S. Cl. ...................... 362/495; 362/511; 362/545; 362/555; 362/559
(58) Field of Search .................. 362/31, 551, 555, 362/559, 576, 459, 478, 481, 487, 495, 511, 543, 544, 545, 153, 153.1, 800

(56) References Cited

U.S. PATENT DOCUMENTS

| 1,460,316 | A |   | 6/1923  | Dobschutz |
| 1,569,867 | A |   | 1/1926  | Lindsay |
| 2,010,374 | A |   | 8/1935  | Pissis |
| 2,561,756 | A | * | 7/1951  | Shook .......................... 362/495 |
| D257,532  | S |   | 11/1980 | Okland |
| 4,463,962 | A |   | 8/1984  | Snyder |
| 4,544,991 | A |   | 10/1985 | Gorsuch |
| D305,323  | S |   | 1/1990  | Anderson et al. |
| 4,985,810 | A |   | 1/1991  | Ramsey |
| D330,536  | S |   | 10/1992 | Holloway et al. |
| RE34,275  | E |   | 6/1993  | Ramsey |
| D336,629  | S |   | 6/1993  | Hinrichs et al. |
| D349,678  | S |   | 8/1994  | Waddington et al. |
| D351,128  | S |   | 10/1994 | Waddington et al. |
| 5,641,221 | A | * | 6/1997  | Schindele et al. .......... 362/501 |
| D395,267  | S |   | 6/1998  | Thompson |
| D395,268  | S |   | 6/1998  | Tucker |
| D397,979  | S |   | 9/1998  | Graneto, III |
| D397,980  | S |   | 9/1998  | Thompson |
| 5,848,830 | A | * | 12/1998 | Castle et al. ................... 362/84 |
| 6,190,027 | B1| * | 2/2001  | Lekson ........................ 362/495 |

\* cited by examiner

*Primary Examiner*—Alan Cariaso
*Assistant Examiner*—Ismael Negron
(74) *Attorney, Agent, or Firm*—Clark Hill PLC

(57) ABSTRACT

A lighted running board assembly having a mounting bracket and a framing network secured to such bracket. An illuminated step pad is secured to and supported by the framing network, such step pad including a light source, such as an LED, housed within a light housing member and disposed in a cavity of the framing network. Light is projected through a translucent surface of the step pad.

14 Claims, 3 Drawing Sheets

ASSEMBLY INCLUDING ILLUMINATED STEP PAD

This application claims the benefit of provisional application No. 60/142,316, filed Jul. 2, 1999.

1. Field of Invention

The subject invention relates to a lighted running board assembly adapted to be mounted to an automotive vehicle.

2. Background of Invention

Conventional lighted running boards are known in the art and are utilized in the automobile and other related industries for both aesthetic and safety related purposes. Recently, conventional lighted running boards have been employed to enhance the aesthetic and safety characteristics of a vehicle. Examples of such conventional lighted running boards are shown in U.S. Pat. Nos. 4,463,962, 4,544,991, and 4,557,494.

With respect to the safety characteristics, light indication on running boards enhances the overall visibility of a vehicle. Further, light indication on running boards also enhances the visibility of the running board for a vehicle operator upon entry and exit from the vehicle. As a direct result of this light indication, the vehicle operator can more effectively identify the location of the running board relative to the vehicle and the ground, and therefore, the vehicle operator can more safely enter and exit the vehicle in dark conditions.

The conventional lighted running boards typically utilize a discrete light source to provide light indication on the running boards. As such, assembly of the lighted running board is tedious, and often, the overall styling of the lighted running board is impaired. Further, the durability and overall performance of the light source is often not protected during extreme, or even normal, operation of the vehicle.

Therefore, it is desirable to provide a lighted running board having a light emitting step pad that incorporates the aesthetic and safety characteristics identified above. Further, it is desirable for the light emitting step pad of the running board to function as a step platform of the running board and protect the performance of the light indicating source enclosed within the running board.

SUMMARY OF THE INVENTION

The subject invention relates to a lighted running board assembly for use on an automotive vehicle. The lighted running board assembly comprises a mounting bracket adapted to be mounted on the vehicle. The lighted running board assembly further includes a generally horizontally extending framing network removably secured to the mounting bracket. The framing network includes at least one recessed mounting cavity. The lighted running board assembly also includes a generally horizontally extending light emitting step pad removably secured to the framing network for providing an ingress and egress step to an occupant of the vehicle. The light emitting step pad forms at least one light housing chamber between the light emitting step pad and the mounting cavity of the framing network and has at least a translucent portion. The lighted running board further includes a light source mounted to the mounting cavity of the framing network and housed within the light housing chamber for projecting light upwardly through the translucent portion of the light emitting step pad.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
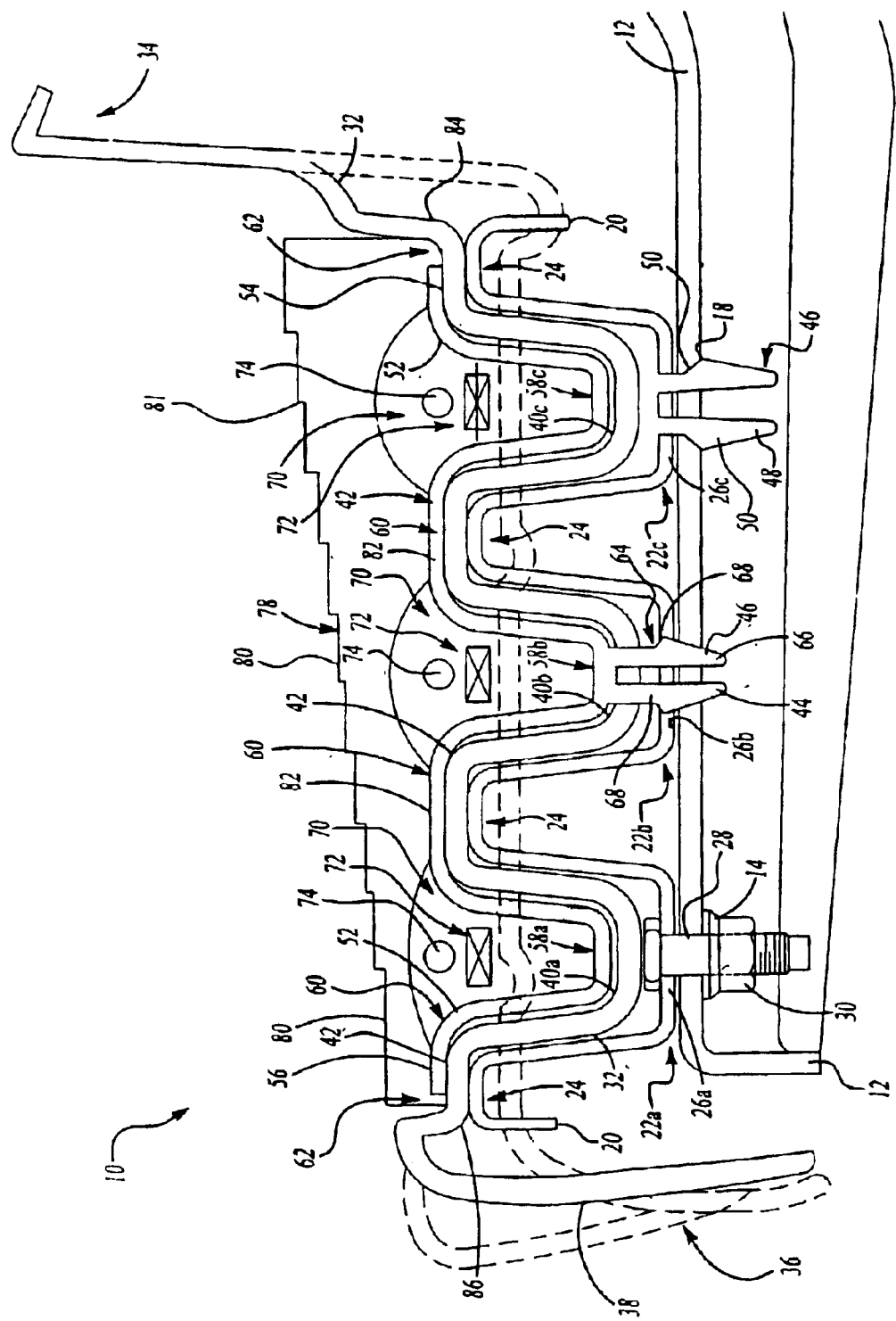
FIG. 1 is a partial cross-sectional view of a lighted running board assembly having a light emitting diode (LED) light source and a stepped light emitting step pad (LESP)

Referring to the Figures, wherein like numerals indicate like or corresponding parts throughout the several views, a lighted running board assembly is generally shown at 10. Referring now to FIG. 1, the lighted running board assembly 10 is primarily supported by a mounting bracket 12 having a plurality of mounting apertures 14, 16, 18. The mounting bracket 12 of the lighted running board assembly 10 is adapted to be rigidly mounted to a vehicle (not shown in the Figures). Furthermore, as discussed below, the mounting apertures 14, 16, 18 of the mounting bracket 12 may be designed to removably receive variously designed connectors including bolts, rivets, and push tabs.

The mounting bracket 12 directly supports a primary support framing network 20. The primary support framing network 20 is preferably constructed of steel to provide overall structural integrity to the lighted running board assembly 10. The primary support framing network 20 includes a plurality of support mounting cavities 22a, 22b, 22c and a plurality of support mounting apexes 24. The support mounting cavities 22a, 22b, 22c alternate relative to the support mounting apexes 24 to provide additional structural integrity to the lighted running board assembly 10. Each support mounting cavity 22a, 22b, 22c of the primary support framing network 20 integrally houses a support mounting aperture 26a, 26b, 26c for connecting the primary support framing network 20 to the mounting bracket 12. More specifically, the primary support framing network 20 is mounted to the mounting bracket 12 by a mounting bolt 28 that extends through the support mounting aperture 26a of the primary support framing network 20 and through the first mounting aperture 14 of the mounting bracket 12. The mounting bolt 28 is fixedly received by a mounting nut 30 housed under the mounting bracket 12.

The primary support framing network 20 directly supports an integral framing network 32. Referring specifically to the partially cross-sectional view of FIG. 1, the integral framing network 32 has a first integral end 34 that is inboard relative to the vehicle, and a second integral end 36 that is outboard relative to the vehicle. The integral framing network 32 is mounted to the vehicle at the first integral end 34. As appreciated, at the first integral end 34, the integral framing network 32 may be directly mounted to the vehicle or may be mounted to the vehicle via an integral mounting bracket (not shown). Further, the integral framing network 32 is preferably constructed of plastic and may extend outboard at the second integral end 36 to form an outboard leading edge 38 of the lighted running board 10. In such a case, where the integral framing network 32 extends at the second integral end 36 to form the outboard leading edge 38 of the lighting running board assembly 10, the plastic construction of the integral framing network 32 is critical to prevent structural chips to the outboard leading edge 38 of the lighted running board assembly 10 from road debris such as rocks and gravel during driving of the vehicle. Further, the outboard leading edge 38 may be appropriately contoured to provide aesthetic effects to the lighted running board assembly 10. Also, the degree to which the integral framing network 32 extends outboard relative to the vehicle contributes an overall safety element to the lighted running board assembly 10 as the further the integral framing network 32 extends, the more clearance there is for a vehicle operator to position his foot upon entering and exiting the vehicle. As appreciated, it is not necessary for the integral framing network 32 to extend and form the outboard leading edge 38 of the lighted running board assembly 10. Instead, an independent running board cover, not shown in the Figures, may form the outboard leading edge 38 of the lighted running board assembly 10. In such a case, the second integral end 36 of the integral framing network 32 extends to the independent running board cover.

The integral framing network 32 includes a plurality of integral mounting cavities 40a, 40b, 40c and a plurality of integral mounting apexes 42. The integral mounting cavities 40a, 40b, 40c alternate relative to the integral mounting apexes 42. Furthermore, as shown in FIG. 1, the integral mounting cavities 40a, 40b, 40c and the integral mounting apexes 42 of the integral framing network 32 interlock with the alternating support mounting cavities 22a, 22b, 22c and support mounting apexes 24 of the primary support framing network 20, respectively, to enhance the overall structural integrity of the lighted running board assembly 10. Further, as represented in FIG. 1, the integral mounting cavity 40b integrally houses an integral mounting aperture 44, and the integral mounting cavity 40c integrally houses an integral mounting extension 46 projecting downward from the integral mounting cavity 40c. The operation of the integral mounting aperture 44 will be discussed herein below. Preferably, the integral mounting extension 46 includes spaced apart resilient push tabs 48 having beveled or tapered expansions 50 as represented. However, the integral mounting extension 46 may be a connector of any suitable design. The integral framing network 32 is mounted to the primary support framing network 20, and correspondingly, to the mounting bracket 12 by the push tabs 48 projecting from the integral mounting cavity 40c and extending downward first through the support mounting aperture 26c of the support mounting cavity 22c and secondly through the third mounting aperture 18 of the mounting bracket 12. The beveled expansions 50 of the push tabs 48 rest below and against the third mounting aperture 18 of the mounting bracket 12 thereby rigidly connecting the integral framing network 32 to the mounting bracket 12. Although FIG. 1 shows the push tabs 48 extending through the third mounting aperture 18 of the mounting bracket 12, alternatively, it is only necessary for the push tab 48 to connect to the primary support framing network 20 which is directly connected to the mounting bracket 12 by the mounting bolt 28.

The integral framing network 32 directly supports a reflective framing network 52 having a first reflective end 54 and a second reflective end 56. Further, the reflective framing network 52 includes a plurality of reflective cavities 58a, 58b, 58c and a plurality of reflective apexes 60. The reflective cavities 58a, 58b, 58c alternate relative to the reflective apexes 60. Furthermore, as shown in FIG. 1, the reflective cavities 58a, 58b, 58c and the reflective apexes 60 of the reflective framing network 52 interlock with the alternating integral mounting cavities 40a, 40b, 40c and integral mounting apexes 42 of the integral framing network 32. This interlocking relationship permits the reflective framing network 52 to be complimentary overlayed onto the integral framing network 32. Once the reflective framing network 52 is overlayed onto the integral framing network 32, slotted gaps 62 are established between the first reflective end 54 and integral framing network 32, and between the second reflective end 56 and the integral framing network 32. The operation of the slotted gaps 62 will become evident through discussion below.

Further, as represented in FIG. 1, the reflective cavity 58b integrally houses a reflective mounting extension 64 projecting downward from the reflective cavity 58b. Preferably, the reflective mounting extension 64 includes a pair of spaced apart push tabs 66 having beveled or tapered expansions 68 as represented. However, the reflective mounting extension 64 may be a connector of any suitable design. The reflective framing network 52 is mounted to the integral framing network 32 and correspondingly to the primary support framing network 20 by the push tab 66 projecting from the reflective cavity 58b and extending downward through the integral mounting aperture 44 of the integral mounting cavity 40b. The beveled expansions 68 of the push tabs 66 rest below and against the integral mounting aperture 44 of the integral mounting cavity 40b thereby rigidly connecting the reflective framing network 52 to the integral framing network 32. Although FIG. 1 shows the push tabs 66 extending through the integral mounting aperture 44 of the integral mounting cavity 40b, alternatively, the push tabs 66 may extend further downward to connect to both the primary support framing network 20 and the mounting bracket 12.

As appreciated, the number and location of the mounting apertures 14, 16, 18; the support mounting apertures 26a, 26b, 26c; the integral mounting aperture 46; and the reflective mounting extension 64 may vary depending on the type of connectors employed in the lighted running board assembly 10, and other manufacturing and design decisions appreciated by those skilled in the art.

Similarly, the number and alternating nature of the support mounting cavities 22a, 22b, 22c and apexes 24; the integral mounting cavities 40a, 40b, 40c and apexes 42; and the reflective cavities 58a, 58b, 58c and apexes 60 may vary depending on the degree of support needed throughout the lighted running board assembly 10, and other manufacturing and design decisions appreciated by those skilled in the art.

Figure 2:
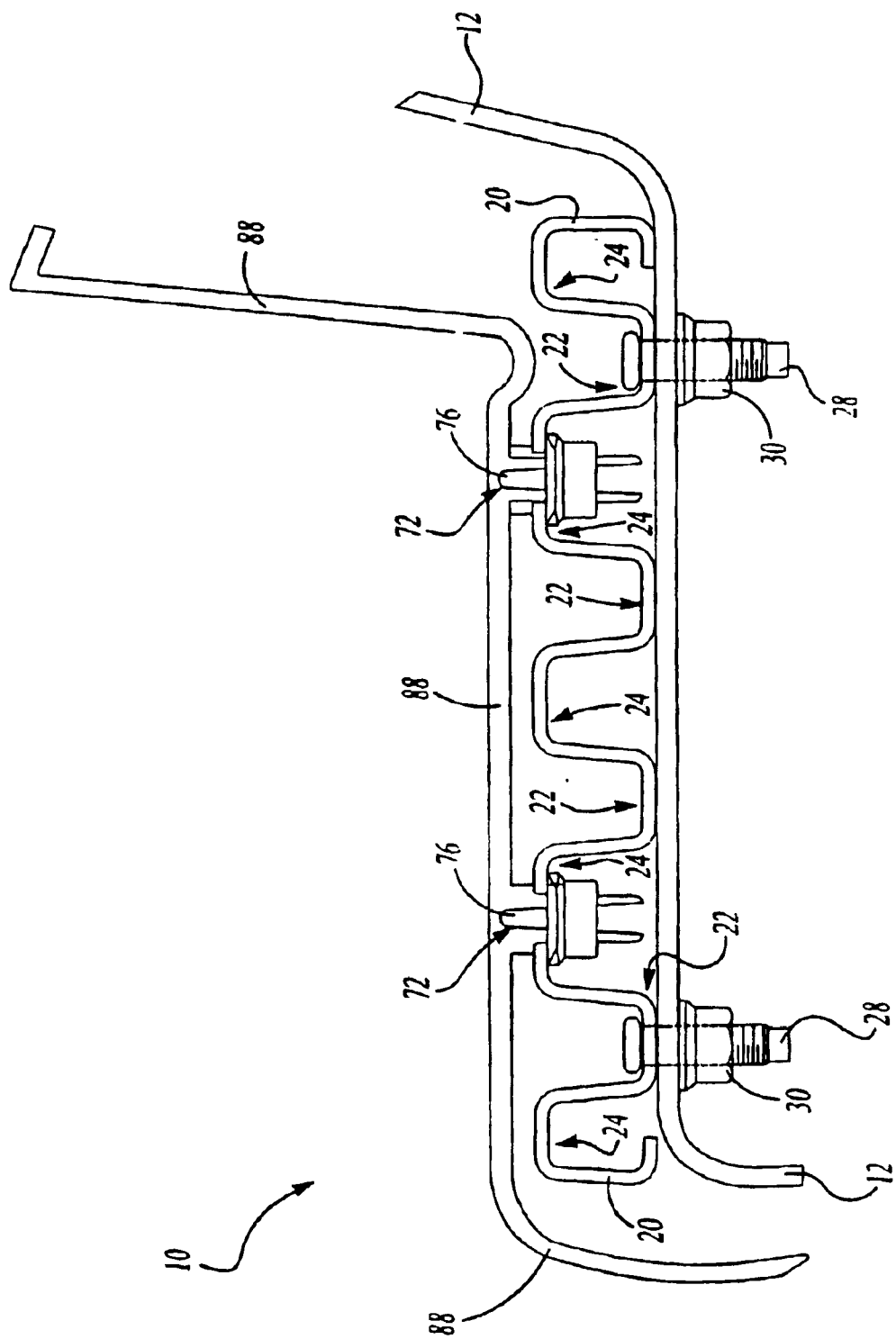
FIG. 2 is a partial cross-sectional view of an alternative lighted running board assembly having a bulb and filament light source and an integral step pad (ISP)

The alternating reflective cavities 58a, 58b, 58c and reflective apexes 60 define light housing chambers 70 therebetween. The light housing chambers 70 integrally house a light source 72. In the preferred embodiment, the light source 72 is typically a light emitting diode (LED) 74. As appreciated, the LED 74 is preferred because the LED 74 directionally emits light, and the direction in which the LED 74 emits light can be controlled. However, the light source 72 may also be any other directional light source, or even a non-directional light source such as a conventional bulb and filament style light source 76 as represented in FIG. 2 and discussed further herein below.

In addition to the directional capability of the LED 74 as the light source 72, the LED 74 is preferable relative to the conventional bulb and filament style light source 76 because the LED 74 requires less amperage to operate, the LED 74 illuminates a larger surface area in the absence of the reflective framing network 52, and use of the LED 74 in the lighted running board assembly 10 requires less packaging than the conventional bulb and filament style light source 76. Finally, the LED 74 is preferred in light of the conventional bulb and filament style light source 76 since the LED 74 does not contain a filament element and, therefore, is more resistant to the vibrational forces exerted on the lighted running board assembly 10 during both normal and extreme operation of the vehicle.

As noted above, in cases where the light source 72 is the conventional bulb and filament style light source 76, the light source 72 tends to be non-directional in nature. That is, light is emitted in scattered directions relative to the originating light source 72. As a result, in cases where the lighted running board assembly 10 is illuminated by conventional bulb and filament style light sources 76, it is critical that the reflective framing network 52 is constructed of a reflective material in order to direct the light emitting from the light source 72 in the appropriate direction, a direction opposite to the reflective framing network 52.

The lighted running board assembly 10 further includes a light emitting step pad (LESP) 78 having a top surface 80 and a plurality of lower support stanchions 82. Referring specifically to FIG. 1, the LESP 78 is supported in combination through the lower support stanchions 82 first, by the integral framing network 32, and second, by the primary support framing network 20, which is positioned immediately below the integral framing network 32 relative to the LESP 78. Furthermore, the LESP 78 includes a first slot end 84 and a second slot end 86. In FIG. 1, the first slot end 84 of the LESP 78 rigidly, yet removably, fits into the slotted gap 62 between the first reflective end 54 and the integral framing network 32, and the second slot end 86 of the LESP 78 rigidly, yet removably, fits into the slotted gap 62 between the second reflective end 56 and the integral framing network 32. As appreciated, the fitting of the LESP 78 between the first reflective end 54 and the integral framing network 32 and between the second reflective end 56 and the integral framing network 32 is not critically dependent on the slot ends 84, 86 and the slotted gaps 62, and instead may be positioned between the first reflective end 54 and the integral framing network 32 and between the second reflective end 56 and the integral framing network 32 by any suitable connecting mechanism. Also as appreciated, for structural purposes, the LESP 78 is constructed of a material strong enough to withstand the immediate forces exerted downwardly on the LESP 78 when the vehicle operator positions his foot directly on the LESP 78 upon entering and exiting the vehicle.

Further, for illuminating purposes, the LESP 78 is preferably constructed of a translucent material in order to permit passage of light from the light source 72. However, as appreciated, in order to counter any potential for scratching or marring of the top surface 80 of the LESP 78, the LESP 78 may be constructed of a semi-opaque material provided that the semi-opaque material possesses enough transmissivity to sufficiently transmit the light source 72. As identified above, light emitted from the LED 74 is directional, and therefore, can be controlled to emit upward through the translucent plastic material of the LESP 78. Furthermore, as depicted in FIG. 1, the top surface 80 of the LESP 78 includes steps 87 in order to encourage safe utilization especially during severe weather conditions such as rain, snow, or sleet. Stepped patterns, or variations thereof, establish a skid or slip resistant top surface 80 of the LESP 78 and provide added safety to the vehicle operator.

The individual steps 87 of the stepped pattern of the top surface 80 may also function as individual light facets to strategically direct light in various directions relative to the light source 72. For example, particularly in cases where the light source 72 is an LED 74, the LED 74 can be directed into a first light facet and the first light facet can proceed to transmit the LED 74 into a subsequent light facet, and so on. In such cases, where the light source 72 can be strategically controlled via the LED 74 and the individual light facets, the LESP 78 is able to be controlled to emit various design symbols customized for the particular customer. This "effect" enhances the overall aesthetic characteristics of the lighted running board assembly 10.

Alternatively, as represented in FIG. 2 and with reference to FIG. 1, the independent nature of the LESP 78 as a discrete component and the independent nature of the integral framing network 32 as described above can be altered. Instead, the LESP 78 and the integral framing network 32 can be integrated to form an integral step pad (ISP) 88 that is molded or shaped to overlay the light source 72 and also function as the top surface 80 of the LESP 78 as described above with reference to FIG. 1. Essentially, as shown in this embodiment, the structure of the primary support framing network 20 accounts for any structural integrity lost by integrating the integral framing network 32 and the LESP 78 to form the ISP 88. The conventional bulb and filament style light source 76 is depicted in FIG. 2, and as a result, the light source 72 is non-directional. As such, the light source 72 is more directly integrated into the ISP 88 which helps prevent scattered light from being directed away from the ISP 88.

Figure 3:
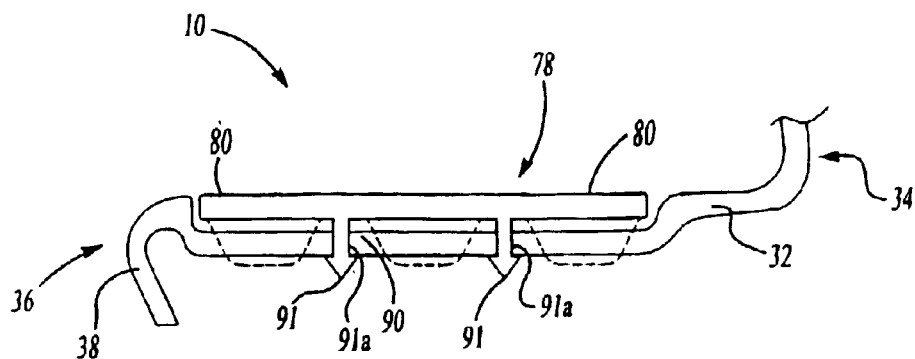
FIG. 3 is a partial cross-sectional view of yet another alternative lighted running board assembly having a flat LESP.

Referring now to FIG. 3, despite the stepped top surface 80 of the preferred embodiment, the top surface 80 of the LESP 78 may also be styled such that the top surface 80 of the LESP 78 is entirely flat and rests flush with the underlying integral framing network 32. In this alternative embodiment, the integral framing network 32 is appropriately contoured to establish a base seat 90 which is sized to rigidly, yet removably receive the LESP 78. In such a case, the LESP 78 includes connectors 91, such as snap-fit tabs, to connect the LESP 78 to the base seat 90 of the integral framing network 32. As appreciated, the base seat 90 of the integral framing network 32 includes connecting reservoirs 91a to receive the connectors of the LESP 78. Employing a LESP 78 with a flat top surface 80 serves primarily aesthetic styling purposes. As such, it may be necessary that the integral framing network 32 extend further outboard from the vehicle to provide the vehicle operator with additional positioning area for his foot upon entering and exiting the vehicle. In other words, in the absence of a stepped top surface 80 of the LESP 78, the top surface 80 may extend further outboard to provide a larger margin of error for the vehicle operator upon entering and exiting the vehicle.

Figure 4:
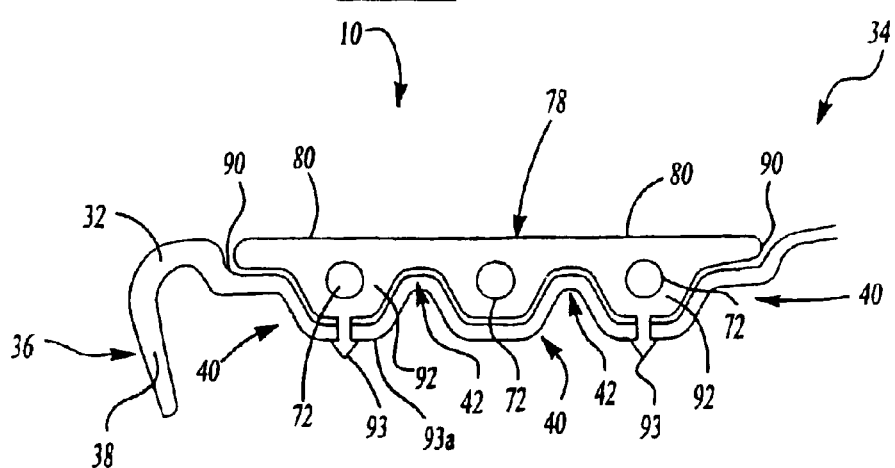
FIG. 4 is a partial cross-sectional view of yet another alternative lighted running board assembly having an LESP molded to integrally house a light source.

Alternatively, as represented in FIG. 4 and with reference to FIG. 1, the reflective framing network 52 and the light housing chambers 70 defined by the alternating reflective cavities 58a, 58b, 58c and the reflective apexes 60 of the reflective framing network 52 may be entirely eliminated. Instead, the LESP 78 may be molded or shaped to integrally house the light source 72 directly within the LESP 78. In such a case, the LESP 78 is molded or shaped to include lower housing channels 92. The lower housing channels 92 of the LESP 78, which include the light source 72, are molded or shaped to interlock with the integral mounting cavities 40a, 40b, 40c and apexes 42 of the integral framing network 32. As appreciated, the lower housing channels 92 are suitably designed to thoroughly protect the light source 72 from vibrational and other damaging forces. Further, the lower housing channels 92 may include channel orifices to permit an electrical connection of the light source 72 originating from below the integral framing network 32. Also as appreciated, since the reflective framing network 52 is eliminated, implementation of the conventional bulb and filament style light source 76 is not desirable as the light source 72 is preferred to be directional, such as the LED 74, in nature. Also, in such a case, the LESP 78 is constructed of a material having the strength to prevent compression forces from destroying the light source 72.

Also, as discussed above with reference to the alternative embodiment of FIG. 3, the integral framing network 32 of the alternative embodiment in FIG. 4 is appropriately contoured to establish a base seat 90 which is sized to rigidly, yet removably receive the LESP 78. As discussed above, the integral mounting cavities 40a, 40b, 40c of the integral framing network 32 house the corresponding lower housing channels 92 of the LESP 78. In such a case, the LESP 78 includes connectors 93, such as snap-fit tabs, to connect the LESP 78 to the base seat 90 of the integral framing network 32. As appreciated, the base seat 90 of the integral framing network 32 includes connecting reservoirs 93a to receive the connectors of the LESP 78. Finally, as appreciated, the LESP 78 represented in FIG. 4 may have either a stepped or flat top surface 80.

Figure 5:
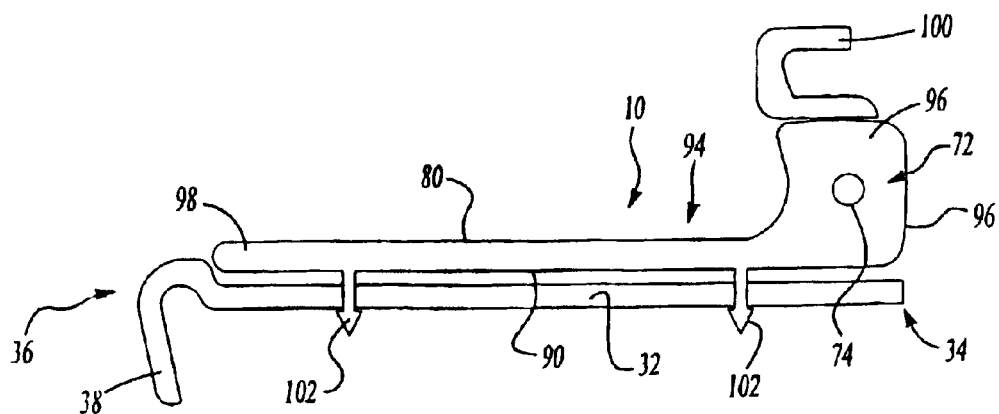
FIG. 5 is a partial cross-sectional view of still another alternative lighted running board assembly having an extruded light pipe.

Finally, as represented in FIG. 5, the lighted running board assembly 10 may eliminate the LESP 78 identified above and alternatively employ an extruded light pipe 94 having a header end 96 and a distal end 98. In this embodiment, the extruded light pipe 94 serves the same function as the function of the LESP 78 described above. However, the extruded light pipe 94, since the header end 96 is contoured above the integral framing network 32, also provides lighted indication on an inboard region of the lighted running board 10. As such, the vehicle operator can more effectively recognize the location of the lighted running board 10 and position his foot more accurately and safely thereon. To employ the extruded light pipe 94, the subject invention incorporates a header component 100. The extruded light pipe 94 is assembled between the header component 100 and between the base seat 90 of the integral framing network 32. As appreciated, the header component 100, the extruded light pipe 94, and the integral framing network 32 possess appropriate connectors 102 to rigidly, yet removably, receive the extruded light pipe 94 between the header component 100 and the base seat 90 of the integral framing network 32. Further, in this embodiment, the extruded light pipe 94 is appropriately contoured so that if the light source 72 is a directionally-controlled LED 74, then the LED 74 can emit light outboard toward the distal end 98 of the extruded light pipe 94 and also upward into the header end 96 of the extruded light pipe 94.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practised other than as specifically described.

What is claimed is:

1. A lighted running board assembly (10) for use on an automotive vehicle, said lighted running board assembly, comprising:
  a mounting bracket (12) adapted for mounting on the vehicle,
  a framing network (20, 32) secured to said mounting bracket (12), said framing network including at least one cavity (22);
  a light emitting step pad (78) secured to and supported by said framing network (20) and presenting an illuminating ingress and egress surface (80), said light emitting step pad having at least one light housing chamber (70) communicating with said cavity of said framing network, said light emitting step pad (78) having a translucent surface (80); and
  a light source (72) mounted in said cavity of said framing network and housed within said light housing chamber (70) projecting light through said translucent surface of said light emitting step pad (78).

2. A lighted running board assembly as set forth in claim 1 wherein said framing network (20) further includes a plurality of recess mounting cavities (22) spaced apart by a plurality of raised apex portion (24) defining a generally sinusoidal cross-section.

3. A lighted running board assembly as set forth in claim 2 wherein said light emitting step pad (78) includes a generally horizontal and planar top surface (80) and a lower portion (82) supported on each of said raised apex portions (24) forming a plurality of light housing chambers (70) between said light emitting step pad and each of said recess mounting cavities.

4. A lighted running board assembly as set forth in claim 3 further including an independent light source (72, 74, 76) mounted to each of said mounting cavities (22) and housing with each of said light housing chambers (70) for projecting light through said light emitting step pad (78).

5. A lighted running board assembly as set forth in claim 4 wherein said framing network including a primary support framing network (20) supported on and removably coupled to said mounting bracket (12), an integral framing network (32) in mating engagement with and removably coupled to said primary support framing network (20), and a reflective framing network in mating engagement with and removably coupled to said integral framing network, said reflective framing network forming a plurality of reflective cavities (58) overlaying said recessed mounting cavities for reflecting light from said light source (72, 74, 76) towards said light emitting step pad (78).

6. A lighted running board assembly as set forth in claim 5 wherein said light emitting step pad (78) includes a plurality of steps (87) extending from said top surface (80) forming a non-planar top surface for providing additional grip to the occupant of the vehicle.

7. A lighted running board assembly as set forth in claim 6 wherein said light source is a light emitting diode (74).

8. A lighted running board assembly as set forth in claim 7 wherein said light source is a bulb and filament (76).

9. A lighted running board assembly for use on an automotive vehicle, said lighted running board assembly comprising:
  a mounting bracket adapted for mounting on the vehicle;
  a generally horizontally extending framing network removably secured to said mounting bracket, said framing network including a lower support portion and an upper header portion;
  a generally horizontally extending light emitting step pad removably secured to said framing network between said lower support portion and said upper header portion for providing an ingress and egress step to an occupant of the vehicle, said light emitting step pad having at least one integrally formed light housing chamber and having at least a translucent portion; and
  a light source mounted within said light housing chamber of said light emitting step pad for projecting light through said translucent portion of said light emitting step pad.

10. A lighted running board assembly as set forth in claim 9 wherein said framing network includes a first end and a horizontally extending second end, said light emitting step pad secured to said framing network between said first and second end.

11. A lighted running board assembly as set forth in claim 10 wherein said light emitting step pad includes a distal end adjacent said second end of said framing network and a header end secured between said upper header portion and said first end of said framing network.

12. A lighted running board assembly as set forth in claim 11 wherein said light housing chamber is integrally formed in said header end of said light emitting step pad and said light source is housed within said light housing chamber to project light upwardly through light emitting step pad adjacent said distal end and outwardly from said header end.

13. A lighted running board assembly as set forth in claim 12 wherein said light emitting step pad forms a light pipe and said light source includes a light emitting diode.

14. A lighted running board assembly for use on an automotive vehicle, said lighted running board assembly comprising:

a mounting bracket (12) adapted to be mounted on the vehicle;

a generally horizontally extending framing network (22) removably secured to said mounting bracket (12), said framing network (22) including at least one recessed mounting cavity (22);

a generally horizontally extending light emitting step pad (88) removably secured to said framing network (20) for providing an ingress and egress step to an occupant of the vehicle, said light emitting step pad (88) having at least one integrally formed light housing chamber in mating engagement with said mounting cavity of said framing network and having at least a translucent portion; and a light source (72) mounted within said light housing chamber of said light emitting step pad for projecting light upwardly through said translucent portion of said light emitting step pad.

\* \* \* \* \*

UNITED STATES PATENT AND TRADEMARK OFFICE
CERTIFICATE OF CORRECTION

PATENT NO. : 6,709,137 B1  Page 1 of 1
APPLICATION NO. : 10/030023
DATED : March 23, 2004
INVENTOR(S) : Glovak et al.

It is certified that error appears in the above-identified patent and that said Letters Patent is hereby corrected as shown below:

Column 8, Claim 2, Line 14, "portion" should be --portions--.
Column 8, Claim 5, Line 28, "including" should be --includes--.

Signed and Sealed this

Nineteenth Day of February, 2008

JON W. DUDAS
*Director of the United States Patent and Trademark Office*